(No Model.)

G. A. YOUNG.
DRIER.

No. 442,213. Patented Dec. 9, 1890.

Witnesses.
C. R. Ferguson.
Wm. H. Robinson.

Inventor.
George A. Young
by his attorneys
Gifford & Brown

UNITED STATES PATENT OFFICE.

GEORGE A. YOUNG, OF BROOKLYN, NEW YORK.

DRIER.

SPECIFICATION forming part of Letters Patent No. 442,213, dated December 9, 1890.

Application filed May 23, 1889. Serial No. 311,890. (No model.)

*To all whom it may concern:*

Be it known that I, GEORGE A. YOUNG, of Brooklyn, in the county of Kings and State of New York, have invented a new and useful Improvement in Driers, of which the following is a specification.

I will describe in detail a drier embodying my improvement, and then point out the novel features in the claims.

Figure 2:
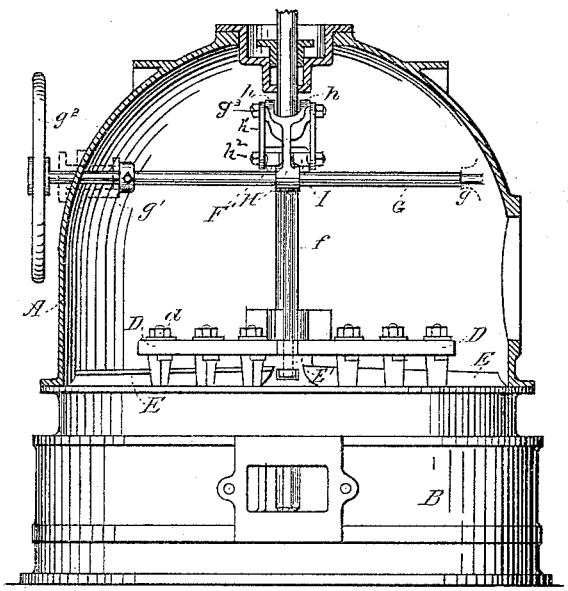
Figure 3:
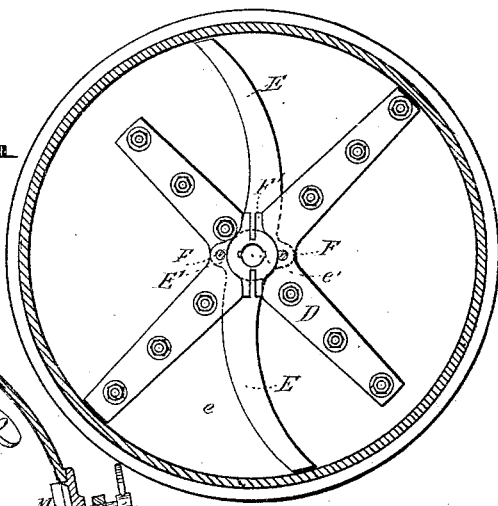
Figure 1:
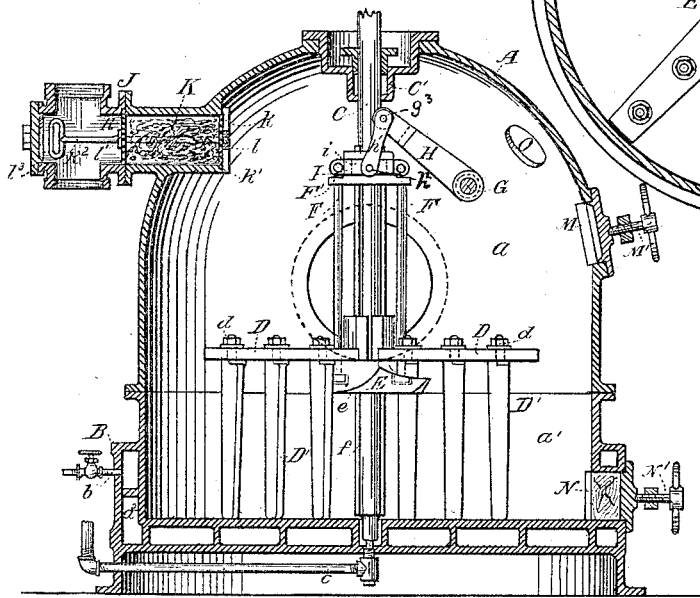

In the accompanying drawings, Figure 1 is a vertical section of a drier embodying my improvement. Fig. 2 is a partial vertical section at right angles to Fig. 1, and Fig. 3 is a plan view of the interior of the drier.

Similar letters of reference designate corresponding parts in all the figures.

In my improvement I employ a vacuum-chamber A, which is here shown as dome-shaped, comprising an upper section $a$ and a lower section or pan $a'$. The lower portion of the pan or section $a'$ is surrounded by a steam-jacket B, which provides an annular steam-space $a^2$, and the steam-space also extends beneath the pan. By this means material within the vacuum-chamber, which constitutes the drying-chamber, is kept warm. Steam is admitted to the steam-space through a pipe $b$, which may be located in any desired position and provided with a suitable cock.

C designates a vertical shaft, which may be rotated in any desired manner. This shaft C has a bearing through a stuffing-box $C'$ in the center of the dome or upper portion of the vacuum-chamber, and its lower bearing is a step-bearing, which may be lubricated from a suitable oil-receptacle through the pipe $c$, which has an opening through the bottom of the bearing, as shown.

Within the chamber is arranged a stirrer, which is here shown as comprising arms D, which are secured to and radiate from the shaft C, and rake-teeth $D'$, depending from the arms. The rake-teeth $D'$ extend to the bottom of the pan and have shank portions on their upper ends, which are screw-threaded and pass through openings in the arms, and are removably secured in place by means of nuts $d$. It is desirable to have the teeth removable, so that should one be broken it may be easily replaced. The several arms D preferably radiate from a common center piece, so that this portion of the stirrer may be in one casting. It is obvious that any number of arms and teeth may be employed.

E shows scrapers, which radiate from and are designed to be moved vertically with a center block $E'$. These scrapers are shown as curved lengthwise and beveled transversely on their upper surface, so that a sharp edge $e$ bears upon the bottom of the pan to scrape the material therefrom and facilitate the discharge thereof. The center block $E'$, carrying the scrapers, is designed to be moved vertically on the shaft C, in order when the scraper is down to remove or discharge the dried material from the chamber. The scrapers and block are also designed to rotate with the shaft. In order to accomplish this, the vertical perforation in the block, through which the shaft extends, is provided with radial recesses or grooves $e'$, which engage the longitudinal ribs $f$ on the shaft C. It will be observed that the scrapers are beneath the rake-teeth arms. Rods F extend upward from the block $E'$ through openings in the arms and engage at their upper ends with a head-block $F'$, which is vertically movable on the shaft C and engages with the shaft in a manner similar to the block E.

G is a shaft for imparting the vertical movement to the scrapers. This shaft G is arranged transversely of the vacuum-chamber and has its inner end seated in a suitable bearing $g$ and its opposite end extended outwardly through a stuffing-box $g'$, where it is provided with a hand-wheel $g^2$.

H is a bifurcated lever keyed rigidly to the shaft G and having its arms $h$ extended to opposite sides of the shaft C. These arms $h$ have link-connections $h'$, with a collar I loosely engaging around a contracted or neck portion $i$ of the head-block $F'$. The links $h'$ are pivoted at one end on lugs $g^3$, extended from the arms $h$, and at the opposite ends on lugs $h^2$, extended from opposite sides of the collar I. It will be seen that the neck portion of the head-block turns readily in the collar, so that the head-block and rigid attachments will rotate with the shaft C. After the material to be dried shall have been placed within the chamber the air is to be drawn from the chamber, which may be done by attaching the outlet-pipe J to a suitable pump. (Not shown in the drawings.)

When the pump is in operation to draw the air from the chamber A, it is desirable that particles of the material to be dried shall not be drawn out with the air. To obviate this, I provide a filter K within the pipe J. This filter K consists of a hollow shell having its removable end walls perforated, as at $k$, or the ends of the cylinder or shell may be covered with wire-cloth that will allow the passage of air. The interior of the filter is closely packed with a loose material $k'$, and for this purpose I prefer to use small pieces of sponge. The filter K may be wholly removed from the pipe when it is desired to clean it or refurnish the sponge by means of the handle $k^2$, which passes entirely through the cylinder and with the aid of the nut $l$ and shoulder $l'$ serves to hold the heads or end walls in place. This filter may be drawn out through an outer opening L, which is normally closed by an air-tight door $l^3$. The material to be dried is placed in the chamber through an opening M, which is provided with a flanged cover held snugly in place by a screw M', and the material may be removed through the opening N at one side near the bottom of the pan. This opening N is provided with a cover held in place by a screw N'. A glass-covered sight-opening O is provided in the upper portion of the dome.

Having described my invention, what I claim is—

1. In a drier, the combination, with the chamber, the steam-jacket, and the vertical shaft, of the arms radiating from the shaft, the rake-teeth depending therefrom, and vertically-movable scrapers below the arms, substantially as specified.

2. In a drier, the combination, with the chamber and the vertical shaft, of the arms secured to and radiating from the shaft, the removable depending teeth, and the vertically-movable scraper below the arms, substantially as specified.

3. In a drier, the combination, with the chamber, the vertical shaft, and the stirrers, of the vertically-movable scraper rotating with said shaft, substantially as specified.

4. In a drier, the combination, with a chamber, stirrers, and a rotary shaft, of a vertically-movable scraper and mechanism, substantially such as described, for moving the scraper vertically, substantially as specified.

5. In a drier, the combination, with a chamber, a vertical shaft, and depending stirrers, of a vertically-movable scraper, a transverse shaft with arm, and link-connections between said shaft and scraper, substantially as specified.

6. In a drier, the combination, with a vacuum-chamber, a vertical shaft, a steam-jacket, and stirrers rotating with said shaft, of scrapers radiating from a center block and rotating with the shaft, a head-block rotating with said shaft, connections between the head-block and scrapers, a collar on the head-block, a transverse shaft, and link-connections between the collar and the shaft, substantially as specified.

GEORGE A. YOUNG.

Witnesses:
C. R. FERGUSON,
WM. H. ROBINSON.